UNITED STATES PATENT OFFICE.

OSCAR GÜNTHER, OF ELBERFELD, GERMANY, ASSIGNOR TO FARBENFABRIKEN VORM. FRIEDR. BAYER & CO., OF ELBERFELD, GERMANY, A CORPORATION OF GERMANY.

AZO COLORING-MATTER.

1,074,429. Specification of Letters Patent. Patented Sept. 30, 1913.

No Drawing. Application filed May 14, 1913. Serial No. 767,581.

*To all whom it may concern:*

Be it known that I, OSCAR GÜNTHER, doctor of philosophy, chemist, citizen of the German Empire, residing at Elberfeld, Germany, have invented new and useful Improvements in New Azo Coloring-Matters, of which the following is a specification.

I have found that new and valuable substantive azo dyestuffs can be obtained by combining with resorcin diazo compounds prepared from azo dyes obtainable from diazo compounds and such a derivative of the 2-amino-5-naphthol-7-sulfonic acid as contains as a substituent a heteronuclear side chain with a diazotizable amino group.

The new azo-coloring matters are after being dried and pulverized dark powders soluble in concentrated sulfuric acid generally with a red coloration. They dye cotton directly in orange to violet-red pure shades fast to acids which become fast to washing by an after treatment with formaldehyde. Upon reduction with stannous chlorid and HCl an aromatic amin, aminoresorcin and a derivative of the 2.6-diamino-5-naphthol-7-sulfonic acid are obtained.

In order to illustrate the new process more fully the following example is given, the parts being by weight:—The monoazo dye obtained from 150 parts of diazotized para-aminoacetanilid and 358 parts of para-aminobenzoyl-2-amino-5-naphthol-7-sulfonic acid is diazotized by means of 69 parts of sodium nitrite and the necessary quantity of hydrochloric acid and the diazo compound is added to a solution of 110 parts of resorcin containing an excess of sodium carbonate. The dye is isolated by the addition of common salt, filtered off and dried. It is after being dried and pulverized in the shape of its sodium salt a dark powder with a metallic luster having in a free state most probably the formula:

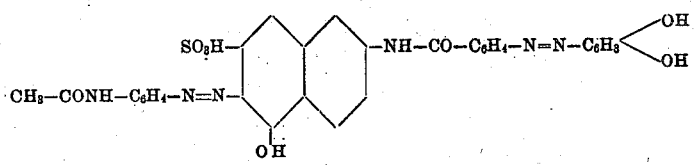

It is soluble in concentrated sulfuric acid with a red coloration. Upon treatment with stannous chlorid and hydrochloric acid para-aminoacetanilid, 2-para-aminobenzoyl-amino-6-amino-5-naphthol - 7 - sulfonic acid and 1-amino-2.4-dioxybenzene are obtained. It dyes cotton in pure red shades.

Instead of para-aminoacetanilid other azo components, such as beta-naphthylamin, ortho-anisidin, meta-xylilin, etc., can be used and instead of para-aminobenzoyl-2-amino-5-naphthol-7-sulfonic acid other of the above mentioned heteronuclear derivatives can be used, e. g. meta-aminobenzoyl-2-amino-5-naphthol-7-sulfonic acid, aminophenyl-1.2-naphthimidazol-5-oxy-7-sulfonic acid, aminophenyl-1.2-naphthothiazol-5-oxy-7-sulfonic acid, 5-oxy-naphtho-1.2-diaminobenzaldehydin-7-sulfonic acid, 5-oxy-1.2-aminophenylnaphthotriazin-7-sulfonic acid, aminophenyl - 2 - azimino - 5 -naphthol-7-sulfonic acid, aminobenzylaminophenyl-1.2-naphthimidazol-5-oxy-7-sulfonic acids or their isomers or derivatives.

I claim:—

1. The herein described new azo dyes, which are after being dried and pulverized dark powders soluble in concentrated sulfuric acid generally with a red coloration; yielding upon reduction with stannous chlorid and HCl an aromatic amin, aminoresorcin and a derivative of the 2.6-diamino-5-naphthol-7-sulfonic acid; and dyeing cotton directly in orange to violet-red pure shades fast to acids and by an after treatment with formaldehyde fast to washing, substantially as described.

2. The herein described new azo dye having in a free state most probably the following formula:

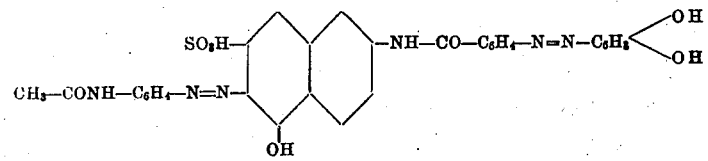

which is after being dried and pulverized in the shape of its sodium salt a dark powder with a metallic luster; soluble in concentrated sulfuric acid with a red coloration; yielding upon treatment with stannous chlorid and hydrochloric acid para-aminoacetanilid, 2-para-aminobenzoylamino-6-amino-5-naphthol-7-sulfonic acid and 1-amino-2.4-dioxybenzene; and dyeing cotton in pure red shades, substantially as described.

In testimony whereof I have hereunto set my hand in the presence of two subscribing witnesses.

OSCAR GÜNTHER. [L. S.]

Witnesses:
 HELEN NUFER,
 ALBERT NUFER.